Patented Feb. 1, 1938

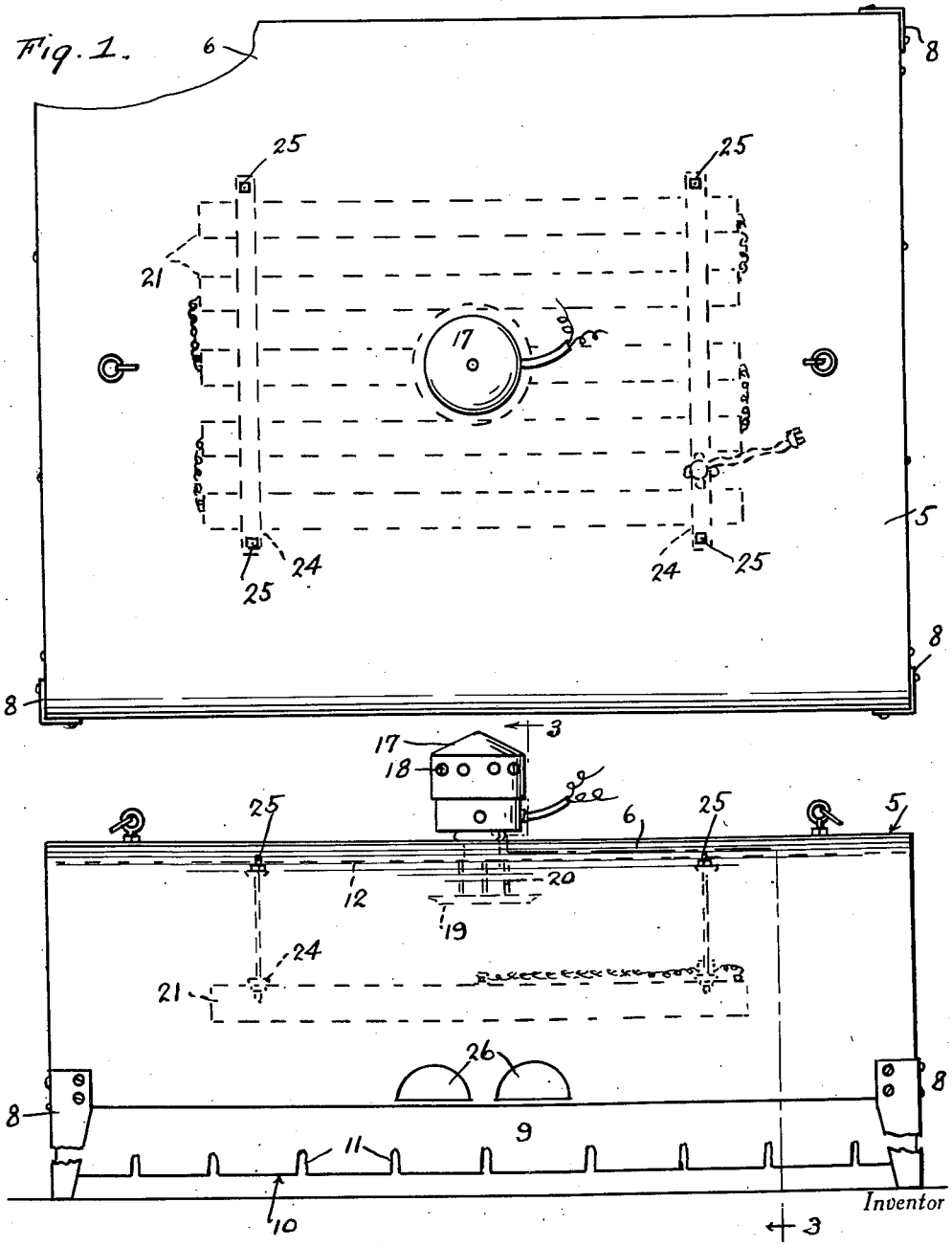

2,106,700

UNITED STATES PATENT OFFICE 2,106,700

BROODER

James A. Aukerman, Peru, Ind.

Application September 19, 1936, Serial No. 101,671

4 Claims. (Cl. 119—33)

The present invention relates to brooders and has for its principal object to provide means for circulating heated air throughout the brooder.

A further object of the invention is to provide a brooder of simple and practical construction, which is strong and durable, relatively inexpensive to manufacture and maintain in use, which is efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view.

Figure 2 is a side elevational view and

Figure 3:
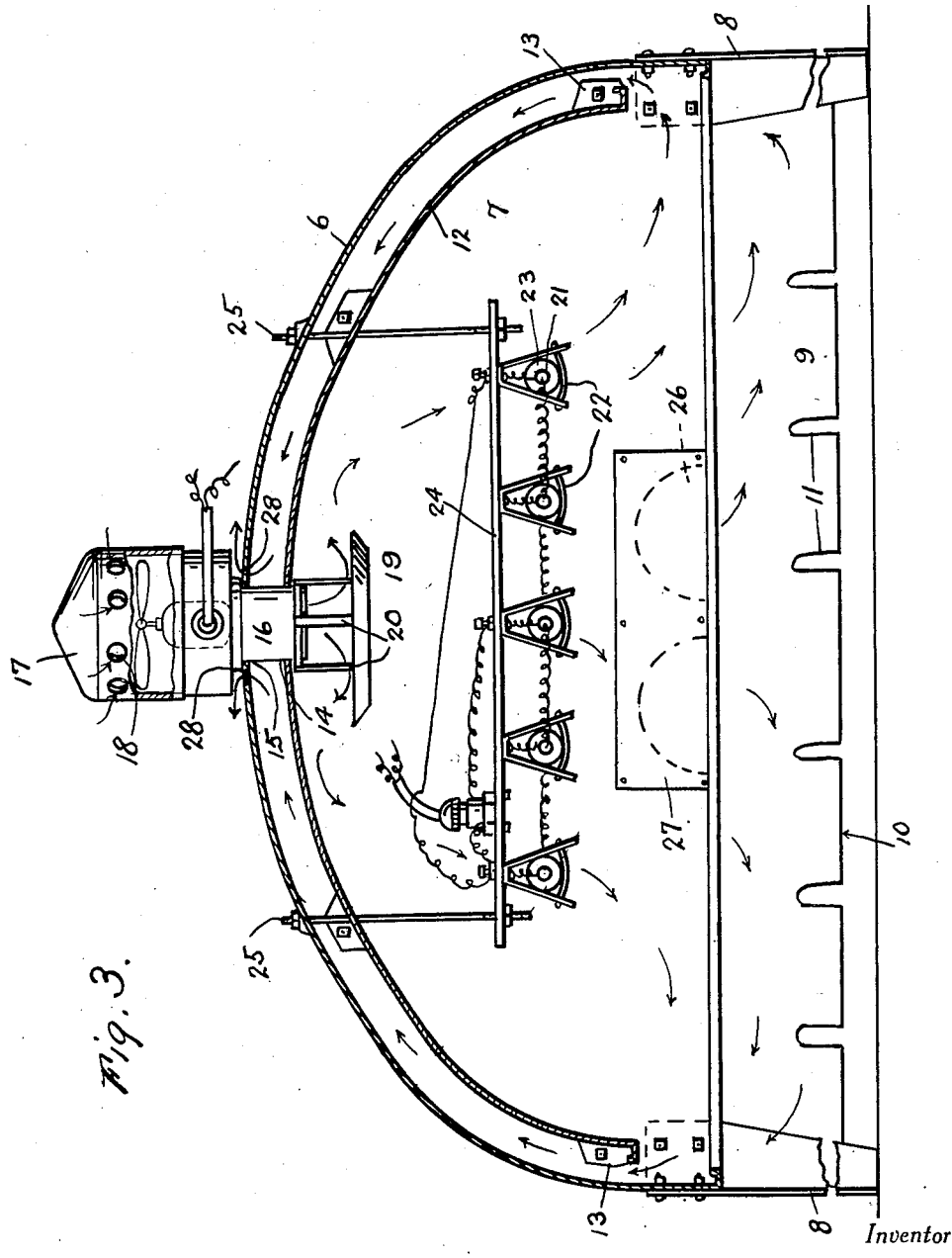
Figure 3 is a vertical transverse sectional view taken substantially on a line 3—3 of Figure 2.

Referring now to the drawings in detail, wherein for the purpose of illustration I have shown the preferred embodiment of the invention, the numeral 5 designates the brooder generally which is formed of a longitudinally arched top 6 closed at each end by end sections 7. The corners of the brooder are supported upon legs 8 and the bottom edges of the arched top 6 as well as the bottom edges of the end sections 7 are formed with curtains 9 having their lower edges 10 terminating in spaced relation above the surface on which the brooder is rested, said lower edges of the curtains 9 being formed with upwardly extending ventilating notches 11.

Spaced inwardly from the arched top and side walls 6 is an inner shell 12 secured to the end walls 7 by angular plates 13. The lower edge of the inner shell 12 is open whereby to provide an air space between the shell and the outer top 6.

The inner shell 12 and top 6 are formed with registering openings 14 and 15 positioned substantially at the central portion of the top and through which a pipe 16 is inserted, the upper end of the pipe communicating with a fan housing 17 within which a conventional fan and electric motor are mounted. Air intake ports 18 are formed in the walls of the housing for drawing air into the housing and forcing the same through the lower open end portion of the pipe 16 to the brooder beneath the inner shell 12 as will be clearly apparent from an inspection of Figure 3 of the drawings. Vent openings 28 are formed in the top 6 adjacent the air intake pipe 16.

A substantially dish-shaped air deflector 19 is suspended beneath the lower end of the pipe 16 by hangers 20.

A plurality of electric heating elements 21 are supported upon brackets 22 extending across the open ends of inverted V-shaped deflectors 23, the upper ends of the deflectors being secured to bars 24 suspended within the brooder by hangers 25 extending upwardly through the top of the brooder.

Openings 26 are formed within the several walls of the brooder which may be closed by removable cover plates 27.

From the foregoing it will be apparent that air will be drawn into the brooder through the fan housing 17 and caused to circulate over the heating coils 21 as indicated by the arrows. A portion of the air will be discharged through the slots 11 in the skirted portion 9 in the bottom of the brooder and the remaining portion of the air will be forced upwardly between the inner shell 12 and top 6 and out through vent openings 28 formed in the top 6 adjacent the fan housing 17. Warm air will thus be distributed throughout the entire area of the brooder and fresh warm air will be constantly circulated therethrough.

Having thus described my invention what I claim is:

1. A brooder comprising an outer shell having vent openings therein, an inner shell spaced therefrom and open at its bottom, an electric heating element in the brooder, a downwardly opening deflector for said heating element, an air feed pipe extending through the walls of said outer and inner shells, means for forcing air through the pipe for feeding air to the interior of the shells, and a deflector interposed between the heating element and the inner end of the pipe to spread the air toward the sides of the brooder for passing between the shells to be discharged through said vent openings.

2. A brooder comprising an outer shell having vent openings therein, an inner shell spaced therefrom and open at its bottom, an electric heating element in the brooder, an air feed pipe extending through the walls of said outer and inner shells, a perforated fan casing mounted at the outer end of the pipe having an electric fan therein for feeding air to the interior of the inner shell, and a deflector interposed between the heating element and the inner end of the pipe to spread the air toward the sides of the brooder for passing between the shells to be discharged through said vent openings.

3. A brooder comprising an outer shell having vent openings therein, an inner shell spaced therefrom and open at its bottom, said shells being longitudinally arched, end walls closing the ends of the shells, an electric heating element suspended in the brooder, a downwardly opening deflector for said heating element, an air feed pipe extending through the top walls of said outer and inner shells, a perforated fan casing mounted at the outer end of the pipe having an electric fan therein for feeding air to the interior of the inner shell, and a deflector interposed between the heating element and the inner end of the pipe to spread the air towards the sides of the brooder for passing between the shells to be discharged through said vent openings.

4. A brooder comprising an outer shell having vent openings therein, an inner shell spaced therefrom and open at its bottom, an electric heating element in the brooder, an air feed pipe extending through the walls of said outer and inner shells, means for forcing air through the pipe for feeding air to the interior of the inner shell, and a deflector interposed between the heating element and the inner end of the pipe to spread the air to the sides of the brooder for passing between the shells to be discharged through said vent openings.

JAMES A. AUKERMAN.